United States Patent
Park et al.

(10) Patent No.: US 7,338,831 B2
(45) Date of Patent: Mar. 4, 2008

(54) METHOD OF FABRICATING SEMICONDUCTOR PROBE WITH RESISTIVE TIP

(75) Inventors: Hong-Sik Park, Seoul (KR); Ju-Hwan Jung, Seoul (KR); Seung-Bum Hong, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 10/552,351

(22) PCT Filed: Nov. 11, 2003

(86) PCT No.: PCT/KR03/02416

§ 371 (c)(1),
(2), (4) Date: Oct. 7, 2005

(87) PCT Pub. No.: WO2004/090971

PCT Pub. Date: Oct. 21, 2004

(65) Prior Publication Data

US 2006/0252172 A1    Nov. 9, 2006

(30) Foreign Application Priority Data

Apr. 10, 2003  (KR) .................. 10-2003-0022570

(51) Int. Cl.
*H01L 21/00* (2006.01)
(52) U.S. Cl. ................. 438/52; 257/E21.154
(58) Field of Classification Search .......... 438/52; 257/E21.154
See application file for complete search history.

(56) References Cited

U.S. PATENT DOCUMENTS

| 5,618,760 | A |   | 4/1997  | Soh et al. |
| 5,648,300 | A | * | 7/1997  | Nakayama et al. ......... 438/611 |
| 6,049,424 | A |   | 4/2000  | Hamagishi |
| 6,479,892 | B1 |  | 11/2002 | Hopson et al. |

FOREIGN PATENT DOCUMENTS

| JP | 10-239331 | 9/1998 |
| JP | 2002-340770 | 11/2002 |
| WO | WO 03/062742 A1 | 7/2003 |

* cited by examiner

*Primary Examiner*—Scott B. Geyer
*Assistant Examiner*—Elias Ullah
(74) *Attorney, Agent, or Firm*—Sughrue Mion, Pllc.

(57) ABSTRACT

Provided is a method of fabricating a semiconductor probe with a resistive tip. The method includes steps of forming a mask layer on a substrate doped with first impurities and forming first and second semiconductor electrode regions heavily doped with the second impurities on the substrate uncovered by the mask layer, annealing the first and second semiconductor electrode regions and diffusing the second impurities of the first and second semiconductor electrode regions to portions facing each other to form resistive regions lightly doped with the second impurities at the outer boundaries of the first and second semiconductor electrode regions, and patterning the mask layer in a predetermined shape and etching a portion of a top surface of the substrate not covered by the patterned mask layer to form a resistive tip.

7 Claims, 12 Drawing Sheets

US 7,338,831 B2

METHOD OF FABRICATING SEMICONDUCTOR PROBE WITH RESISTIVE TIP

TECHNICAL FIELD

The present invention relates to a method of fabricating a semiconductor probe with a resistive tip, and more particularly, to a method of fabricating a semiconductor probe with a resistive tip in which a resistive region is formed through a doping process and a thermal diffusion process.

BACKGROUND ART

As compact products, such as mobile communication terminals and electronic pocket notes become more popular, the demand for a micro integrated non-volatile recording medium increases. It is not easy to downsize existing hard disks nor to highly integrate flash memories. Therefore, an information-storage device using a scanning probe has been studied as an alternative.

Probes are used in various scanning probe microscopy (SPM) techniques. For example, probes are used for a scanning tunneling microscope (STM) which detects current produced when voltage is applied between a probe and a sample to reproduce information, an atomic force microscope (AFM) which uses an atomic force between a probe and a sample, a magnetic force microscope (MFM) which uses an interaction force between a magnetic field from a sample and a magnetized probe, a scanning near-field optical microscope (SNOM) which overcomes a resolution limitation due to the wavelength of visible light, and an electrostatic force microscope (EFM) which uses an electrostatic force between a sample and a probe.

In order to record and reproduce information at high speed and density using such SPM techniques, a probe should be capable of detecting surface charge existing in a region of several tens of nanometers in diameter and being fabricated into an array of cantilevers to improve the speed of recording and reproduction.

FIG. 1A is a perspective view of a probe of a scanning probe microscope with a metal-oxide semiconductor field-effect transistor (MOSFET) channel structure as disclosed in Korean Laid-open Patent Publication No. 2001-45981. FIG. 1B is an enlarged view of a portion "A" in FIG. 1A.

Referring to FIG. 1A, a probe 10 formed by etching a semiconductor substrate 20 protrudes in the form of a cantilever from the semiconductor substrate 20. The probe 10 is connected to electrode pads 20a and 20b located at either side of the probe 10.

Referring to FIG. 1B, a source region 11 and a drain region 13 are formed at inclined surfaces of a V-shaped tip of the probe 10 and a channel region 12 is formed in the middle of the tip between the source region 11 and the drain region 13.

Since the tip of the probe 10 is located at the end of the cantilever, it is difficult to fabricate the probe with tip having a radius of several tens of nanometers into an array form. In the prior art, probes with a tip having a radius of several tens of nanometers have been fabricated through several processes including an oxidation process so that the tip is vertically formed on a cantilever.

However, after a tip of several micrometers in height has been formed, the precision of a subsequent photolithographic process considerably deteriorates. As a result, it is difficult to form a source region and a drain region with a short channel interposed therebetween. Further, even though a short channel can be realized through a diffusion process, it is also difficult to align the short channel at the end of the center of the tip due to alignment errors caused during the photolithographic process.

FIG. 2A and FIG. 2B are schematic cross-sectional views for explaining a method of reproducing information using a MOSFET tip in which a source electrode 11 and a drain electrode 13 are formed.

Referring to FIG. 2A, the V-shaped MOSFET tip 10 doped with p-type impurities includes the source region 11 and the drain region 13 doped with n-type impurities formed at inclined surfaces thereof. The conventional MOSFET tip 10 is moved over the surface of a recording medium 15 to detect current flowing along a channel 12 in response to the polarity of surface charge 17. In this way, the polarity and intensity of the surface charge 17 are determined.

FIG. 2B is an enlarged view of the peak of the MOSFET tip 10, schematically illustrating a state in which a depletion region 14 is diffused.

Referring to FIG. 2B, when the tip 10 of the probe is positioned above a positive surface charge 17 inside the recording medium 15, holes of the channel region 12 doped with p-type impurities are depleted at the end of the tip due to the electric field of the positive surface charge 17.

When the electric field is stronger than an electric field which causes the depletion region to reach its maximum size, a channel of electrons which are minority carriers is formed at the end of the tip. When an even higher electric field is applied, a channel of electrons contacting the source region 11 and the drain region 13 is formed, and current flows through the channel due to voltage applied between the source region 11 and the drain region 13.

That is to say, the conventional MOSFET tip functions as a transistor only when the electric field generated by the surface charge is higher than a threshold electric field value which can form a channel of minority carriers up to the source region and the drain region. Since surface charge generating an electric field smaller than the threshold electric field value cannot be detected, the MOSFET tip operates within a limited range and the sensitivity of the MOSFET probe 10 is low.

DISCLOSURE OF THE INVENTION

The present invention provides a method of fabricating a semiconductor probe with a resistive tip which has an improved electric field sensitivity, by using a self-alignment method.

In accordance with an aspect of the present invention, there is provided a method of fabricating a semiconductor probe which includes a cantilever and a tip doped with first impurities formed on an end portion of the cantilever, wherein a resistive region lightly doped with second impurities is formed at a peak of the tip and first and second semiconductor electrode regions heavily doped with the second impurities are formed at inclined surfaces of the tip, the polarity of the second impurities being opposite to that of the first impurities, the method comprising: (a) forming a stripe-shape mask layer on a substrate doped with first impurities and forming first and second semiconductor electrode regions by heavily doping second impurities on the substrate uncovered by the mask layer, the second impurities being opposite in polarity to the first impurities; (b) annealing the substrate to narrow a distance between the first and second semiconductor electrode regions and form resistive regions lightly doped with the second impurities at outer boundaries of the first and second semiconductor electrode regions; (c) patterning the mask layer in a predetermined shape and etching a portion of a top surface of the substrate not covered by the patterned mask layer to form a resistive tip; and (d) etching a bottom surface of the substrate to form a cantilever with the resistive tip formed at an end portion thereof.

Step (b) may form a tip forming portion by allowing the resistive portion obtained by diffusing the first and second semiconductor electrode regions to come in contact with each other.

Step (c) may further include forming a stripe-shape photoresist in an orthogonal direction to the mask layer, and performing an etching process to make the mask layer in a rectangular shape.

Step (c) may further include: removing the patterned mask layer from the substrate and annealing the substrate under an oxygen atmosphere to form an oxide layer of a predetermined thickness on the surface of the substrate including the tip; and removing the oxide layer to sharpen an end of the resistive regions.

Step (c) may form a tip forming portion by diffusing the first and second semiconductor electrode regions come in contact with each other on an upper part of the substrate to form a tip forming portion.

Preferably, the first impurities are p-type impurities and the second impurities are n-type impurities, or the first impurities are n-type impurities and the second impurities are p-type impurities.

BEST MODE FOR CARRYING OUT THE INVENTION

Figure 1A:
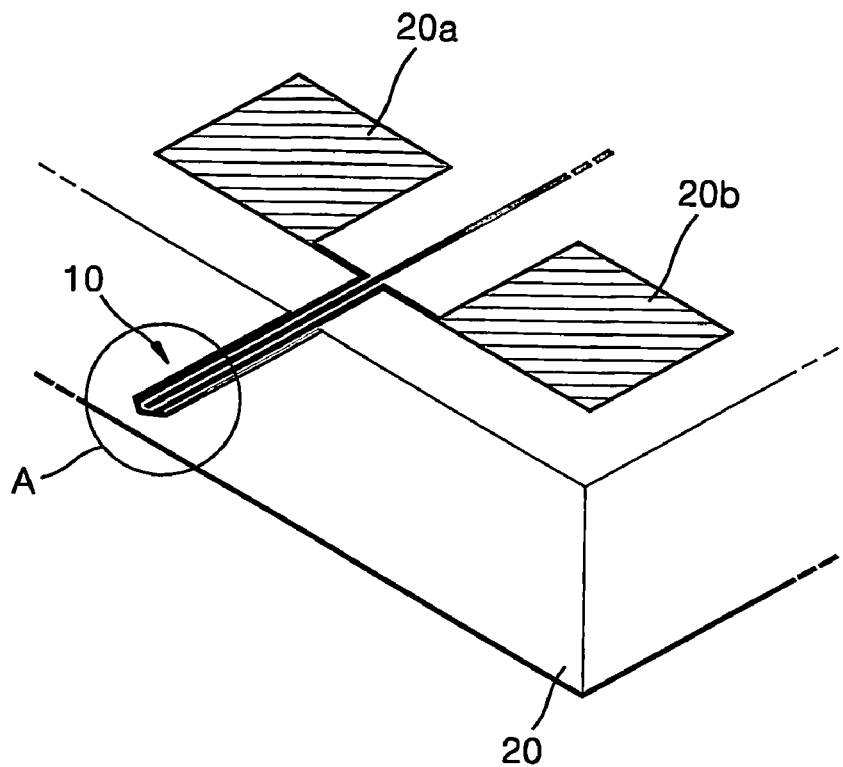
FIG. 1A is a perspective view of a probe of a conventional scanning probe microscope.
Figure 1B:
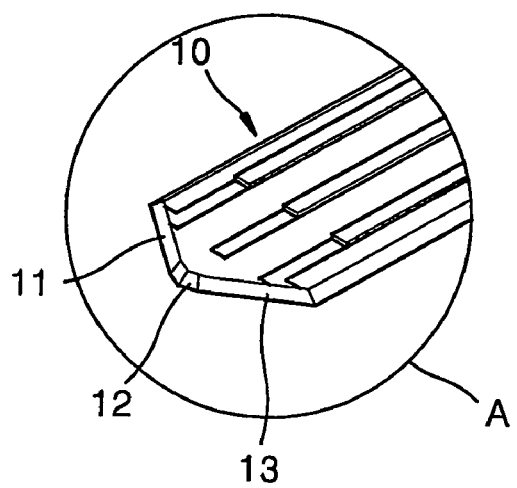
FIG. 1B is an enlarged view of a portion "A" of FIG. 1A.

A method of fabricating a semiconductor probe with a resistive tip according to a preferred embodiment of the present invention will be described in detail with reference to accompanying drawings. The thickness of layers and regions shown in the drawings is exaggerated for clarity.

Figure 3:
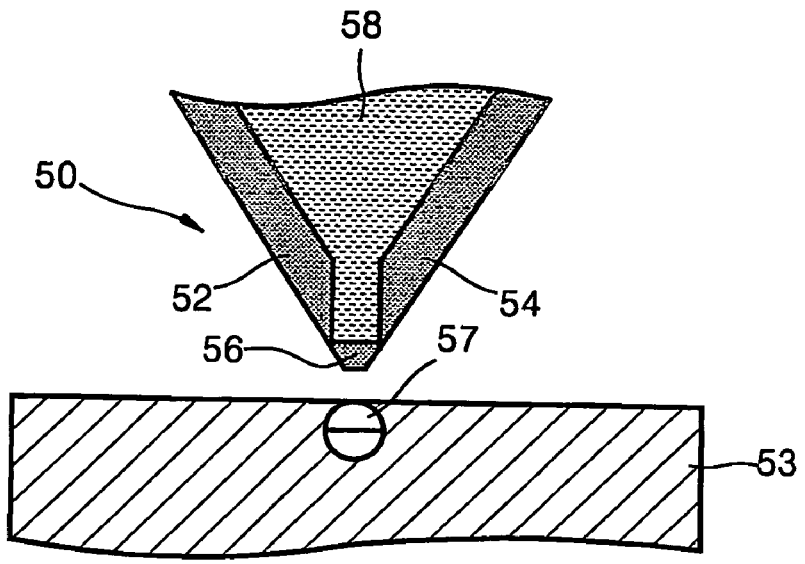
FIG. 3 is a schematic cross-sectional view illustrating a semiconductor probe with a resistive tip according to a preferred embodiment of the present invention.

FIG. 3 is a schematic cross-sectional view illustrating a resistive tip of a semiconductor probe fabricated according to an embodiment of the present invention.

Referring to FIG. 3, a tip 50 of a semiconductor probe includes a body 58 doped with first impurities, a resistive region 56 lightly doped with second impurities formed at the peak of the tip, and first and second semiconductor electrode regions 52 and 54 heavily doped with second impurities and formed at inclined surfaces of the probe with the resistive region 56 interposed therebetween. The first impurities are p-type impurities and the second impurities are n-type impurities. Alternatively, the first impurities are n-type impurities and the second impurities are p-type impurities.

A difference in the quantity of surface charge 57 of a recording medium causes a difference in the intensity of an electric field. The difference in the intensity of the electric field causes a difference in a resistance value of the resistive region 56. The polarity and intensity of the surface charge can be detected based on variations of the resistance value.

Figure 4:
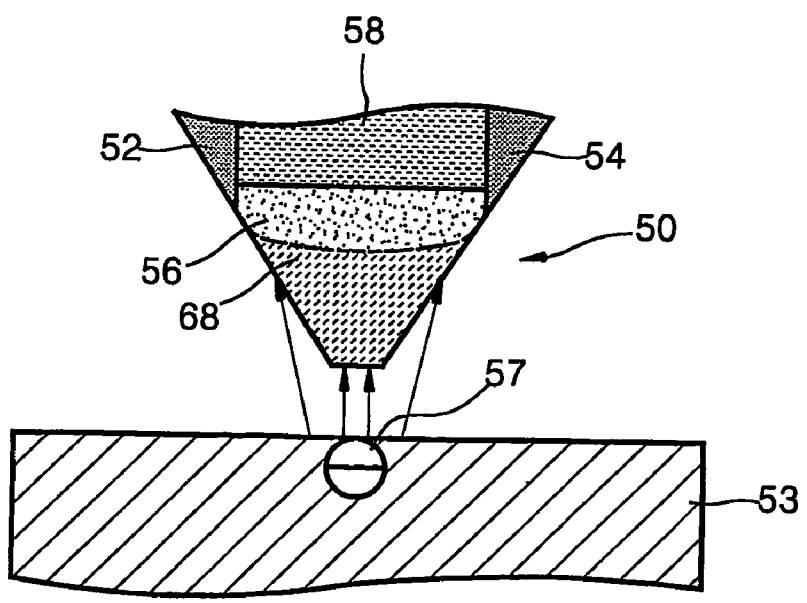
FIG. 4 is a schematic diagram for explaining a principle of how a depletion region is expanded in the probe of FIG. 3.

FIG. 4 is a schematic cross-sectional view for illustrating an expansion of a depletion area in a resistive tip according to the present invention.

Figure 2A:
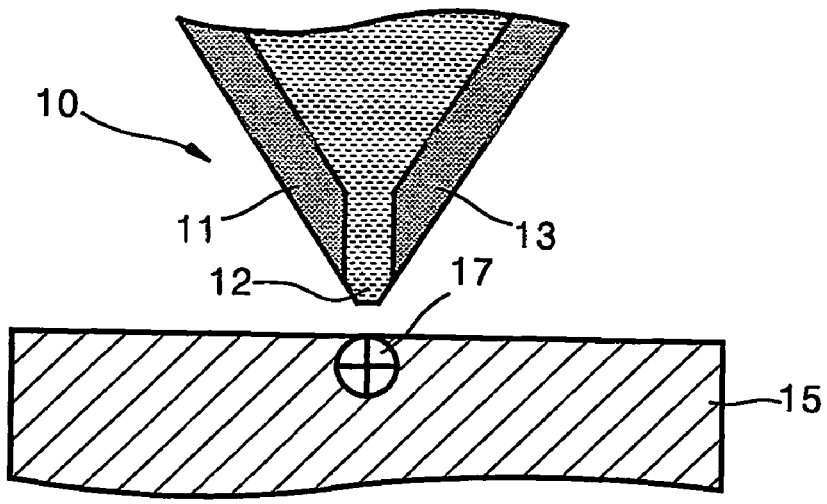
FIG. 2A is a schematic cross-sectional view for explaining a method of detecting surface charge of a recording medium using a conventional MOSFET tip.
Figure 2B:
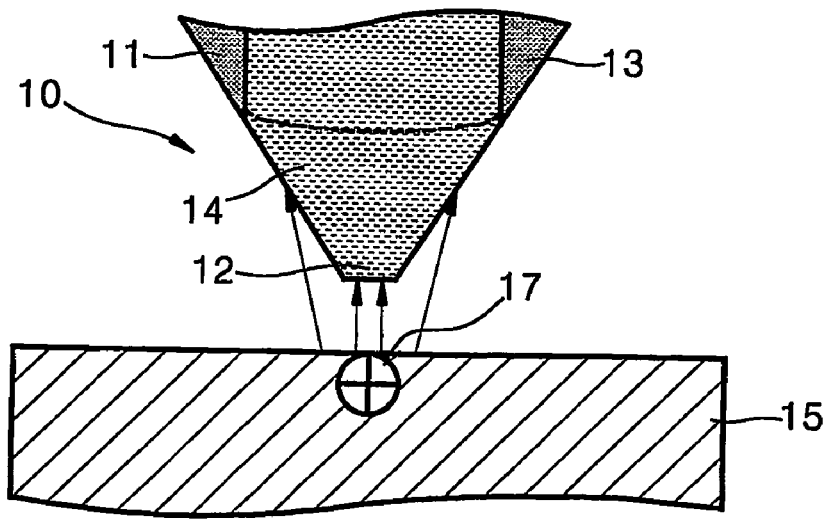
FIG. 2B is a schematic cross-sectional view for explaining a principle of how a channel is formed at the conventional MOSFET tip.

In a conventional field-effect transistor (FET) tip 10 as shown in FIG. 2b, when a depletion region reaches its maximum size, a channel of electrons which are minority carriers is formed at the end of the tip. When the channel of electrons is formed in contact with a source region 11 and a drain region 13, current flows between the source region 11 and the drain region 13. Thus, the polarity of surface charge can be determined based on the intensity of the current. However, in the resistive tip 50 shown in FIG. 4, although a depletion region 68 does not extend up to the first and second semiconductor electrode regions 52 and 54, the volume of the resistive region 56 is reduced due to the depletion region 68 which acts as a non-conductor. As a consequence, the resistance value of the resistive region 56 changes, so that the polarity and intensity of the surface charge 57 can be detected. The semiconductor probe shown in FIG. 4 is superior in sensitivity to the conventional FET tip because a threshold electric field for sensing surface charge is lowered.

Referring to FIG. 4, the depletion region 68 formed in the resistive region 56 gradually extends toward the first and second semiconductor electrode regions 52 and 54 due to an electric field generated by negative surface charge 57.

FIGS. 5A through 5I are perspective views sequentially explaining the method of fabricating the semiconductor probe according to the preferred embodiment of the present invention.

First, a mask layer 33, such as a silicone oxide layer or a silicon nitride layer, is formed on the surface of a silicon substrate 31 or a siilicon-on-insulator (SOI) substrate doped with first impurities. A photoresist 35 is then deposited on the surface of the mask layer 33, and a stripe-shape mask 38 is disposed above the photoresist 35 (see FIG. 5A).

Figure 5A:
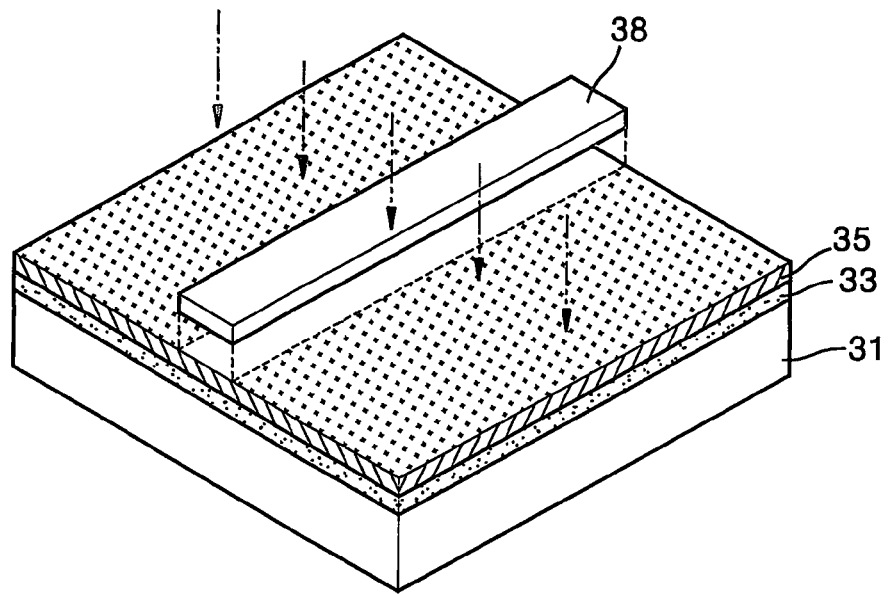
FIGS. 5A through 5I are schematic perspective views explaining a method of fabricating the probe according to the preferred embodiment of the present invention.
Figure 5B:
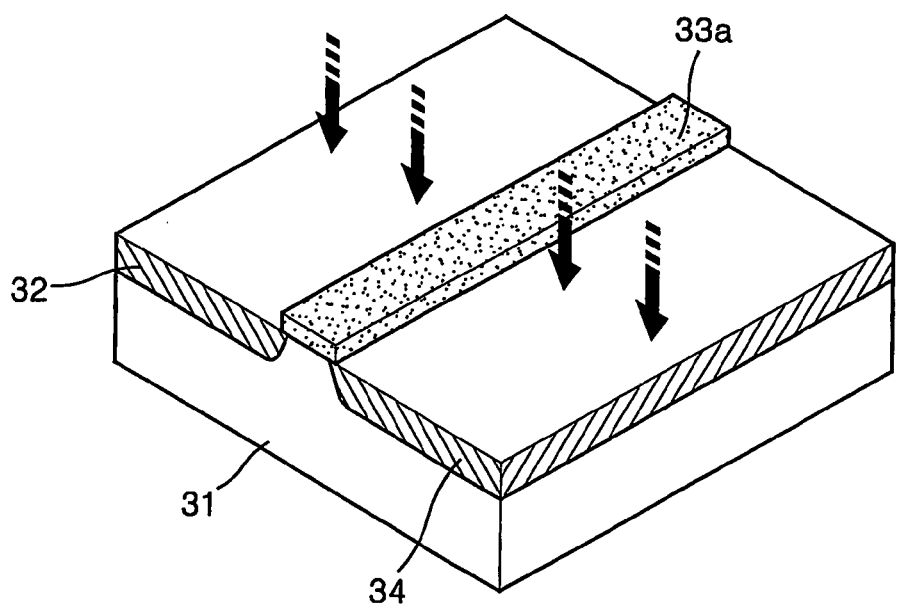
Figure 5C:
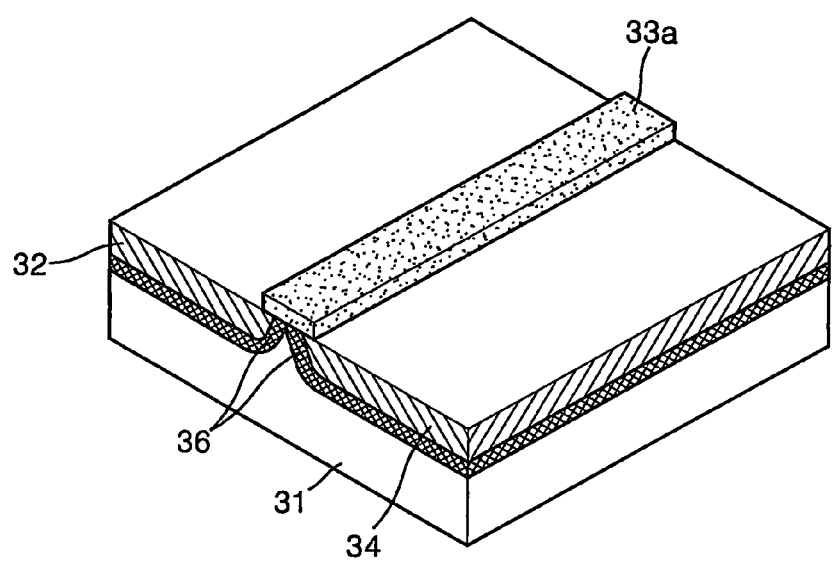

Next, a stripe-shape mask layer 33a is formed on the substrate 31 through photolithography and etching processes as shown in FIG. 5B, and then portions other than the mask layer 33a are heavily doped with second impurities to form first and second semiconductor electrode regions 32 and 34. The resistivity of the first and second semiconductor electrode regions 32 and 34 is so low that they can serve as conductors. Next, the substrate 31 undergoes an annealing process to make a distance between the first and second semiconductor electrode regions 32 and 34 smaller than the width of the mask layer 33a. As shown in FIG. 5C, when the first and second semiconductor electrode regions 32 and 34 heavily doped with the second impurities are extended, the second impurities are diffused to portions contiguous with the regions 32 and 34 to form regions doped with low-density impurities, that is, resistive regions 36. The resistive regions 36 under the mask layer 33a are in contact with each other to form a tip forming portion of the resistive tip, which will be described hereinbelow. The contact between the resistive regions 36 may be carried out in a thermal oxidation process which will be explained hereinbelow.

Figure 5D:
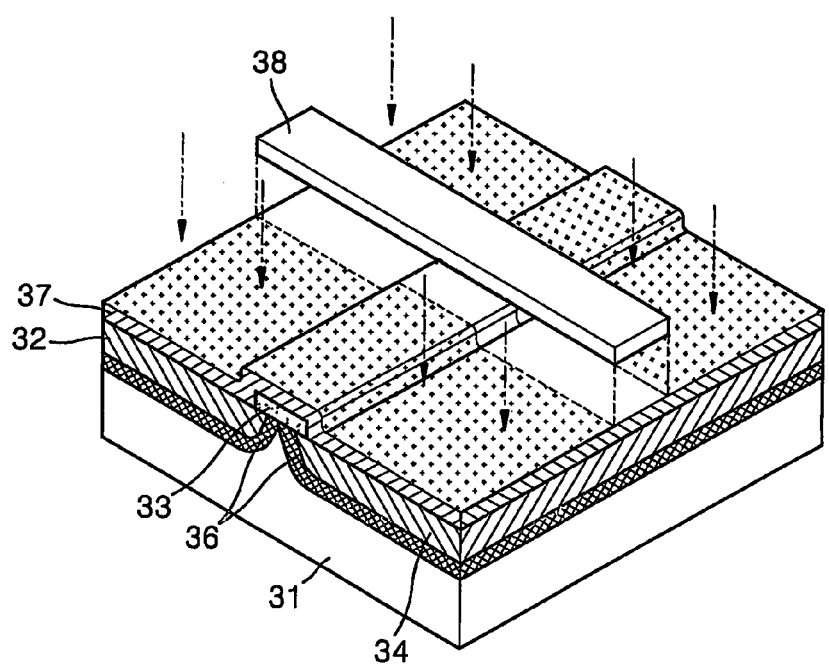
Figure 5E:
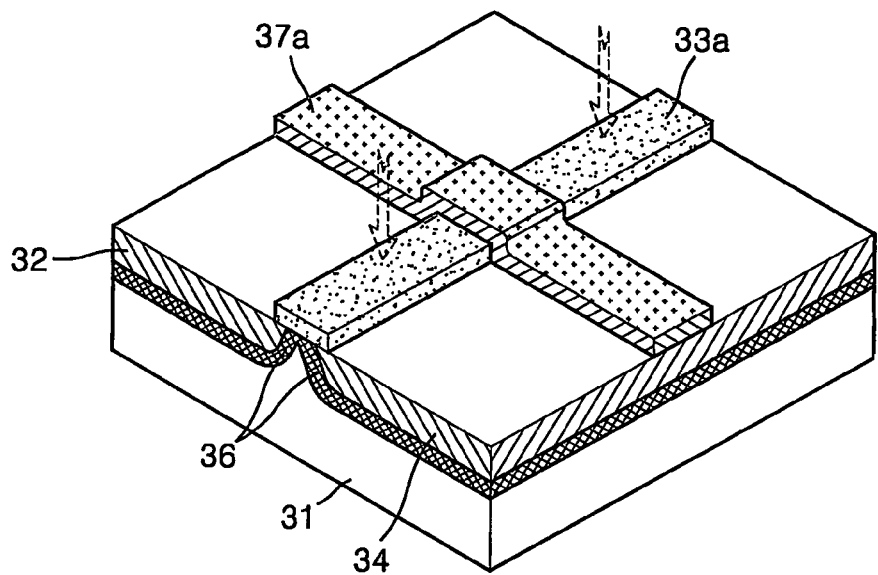

Then, as shown in FIG. 5D, another photoresist 37 is deposited on the substrate 31 to cover the mask layer 33a and then a stripe-shape photo mask 38 is disposed above the photoresist 37 in an orthogonal direction to the mask layer 33a. Then, a photoresist layer 37a, as shown in FIG. 5E, having the same shape as the photo mask 38 is formed through exposure, development and etching processes.

Figure 5F:
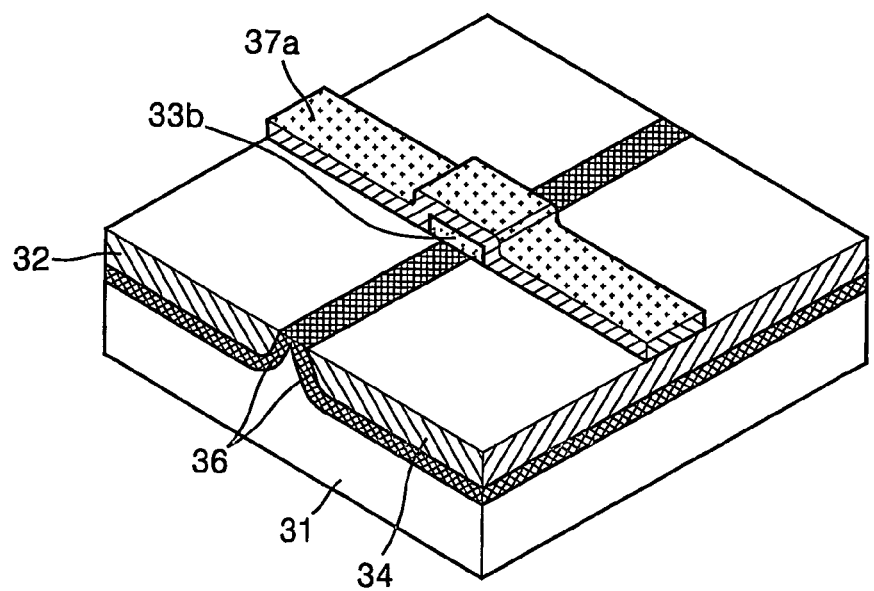

Thereafter, as shown in FIG. 5F, portions of the mask layer 33a not covered by the stripe-shape photoresist layer 37a are etched to form a rectangular mask layer 33b.

Figure 5G:
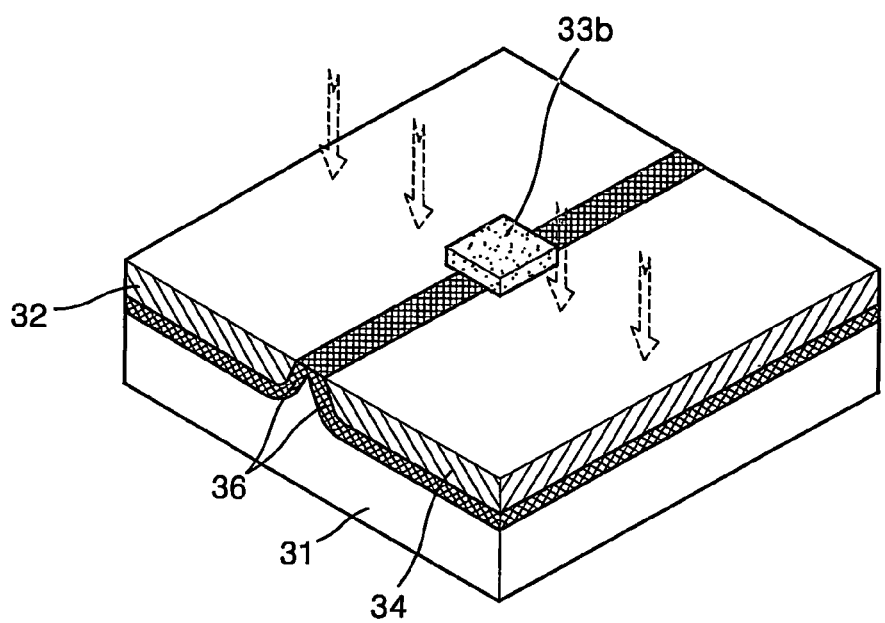
Figure 5H:
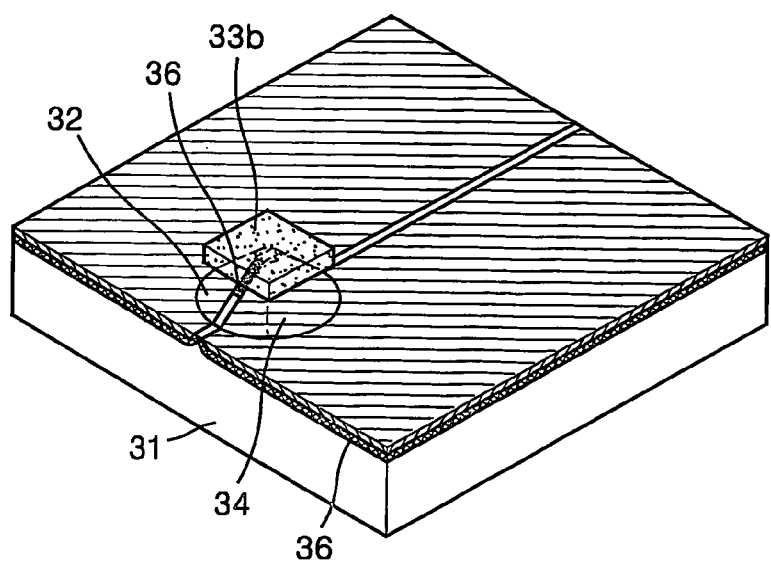

Next, as shown in FIG. 5G, the photoresist layer 37a is removed, the substrate 31 is etched using the rectangular mask layer 33b as a mask to locate the first and second semiconductor electrode regions 32 and 34 at inclined surfaces of the tip 30 (see FIG. 5I), and to align the resistive regions 36 at the peak of the tip 30 (see FIG. 5H).

After the mask layer 33b is removed, the substrate is heated under an oxygen atmosphere to form a silicon oxide layer (not shown) of a predetermined thickness on the substrate. When the oxide layer is removed, the end of the resistive regions is sharpened. Through this thermal oxidation process, the separated resistive regions 36 can contact each other.

Figure 5I:
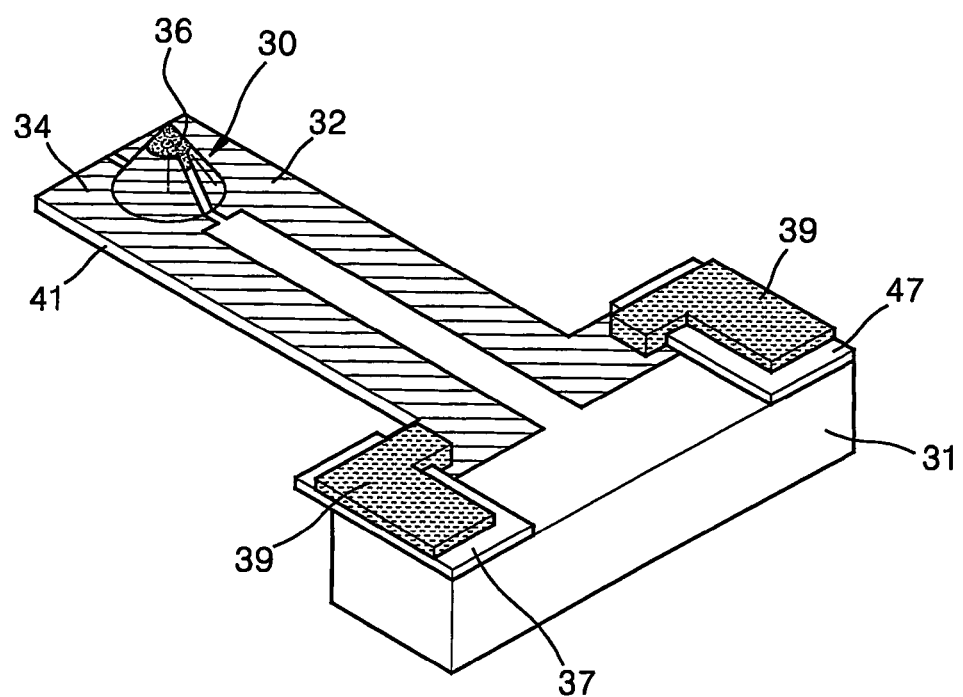

Then, the bottom surface of the substrate 31 is etched to form a cantilever 41 with the resistive tip mounted on the end thereof. The first and second semiconductor electrode regions 32 and 34 are connected to electrode pads 39 on the substrate 31 to complete a semiconductor probe as shown in FIG. 5I. The electrode pads 39 are insulated by an insulating layer 43.

In the method of fabricating the semiconductor probe according to the preferred embodiment of the present invention, an ion injection process forming the first and second semiconductor electrode regions 32 and 34 is performed before fabricating the tip 30, so that a fine photolithographic process can be performed and the resistive regions 36 can be easily formed through the thermal diffusion process.

FIGS. 6A through 6E are computer simulation graphs illustrating steps of forming the resistive regions according to the preferred embodiment of the present invention. Elements which are substantially the same as those of FIGS. 5A through 5I are given the same reference numerals in FIGS. 6A through 6E.

Figure 6A:
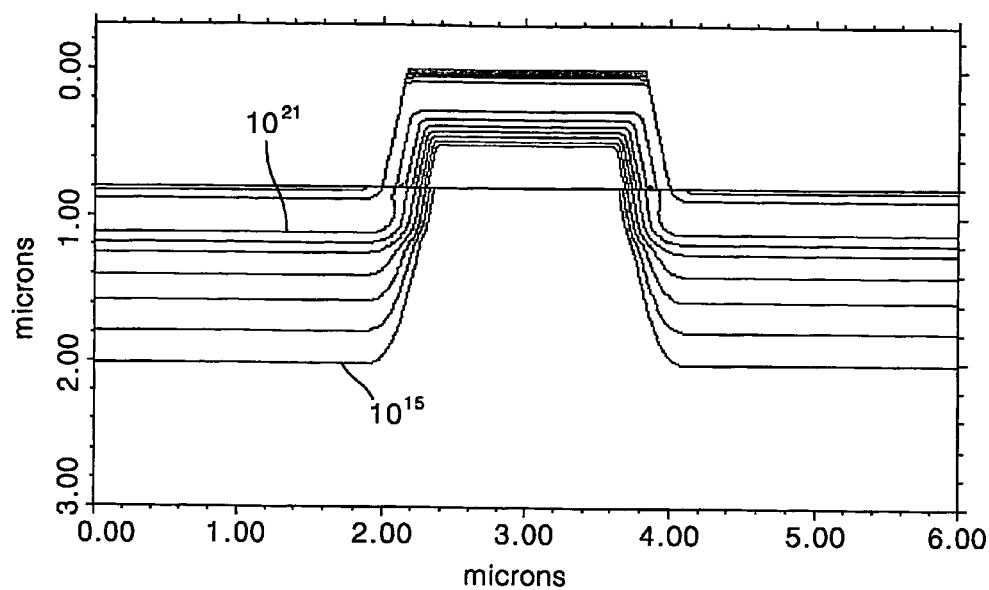
FIGS. 6A through 6E are simulation graphs illustrating steps of forming resistive regions according to the preferred embodiment of the present invention.

Firstly, referring to FIG. 6A, when portions other than the mask layer 33 on the silicon substrate 31 doped with p-type impurities at a density of $10^{15}$ are ion-injected with n-type impurities, the portions from the outer surface of the substrate 31 to the inside of the substrate 31 are successively doped with impurities from $10^{21}$ to $10^{15}$. The first and second semiconductor electrode regions 32 and 34 heavily doped with the second impurities have so low a resistivity that they act as conductors.

Figure 6B:
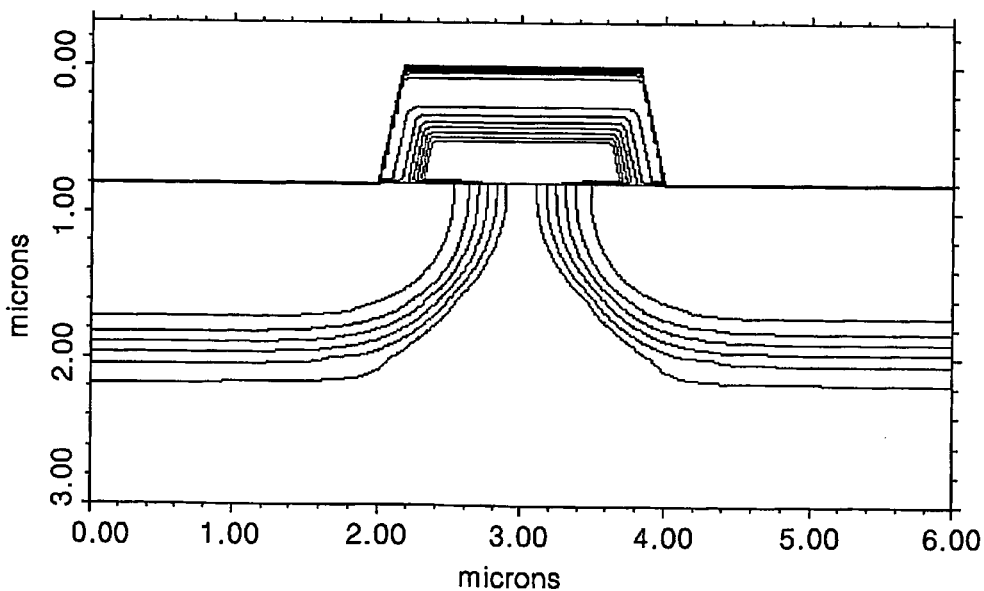

Then, as shown in FIG. 6B, the distance between the first and second semiconductor electrode regions 32 and 34 becomes smaller than the width of the mask layer 33 through an annealing process, and the impurities are further diffused such that the portions doped with impurities of $10^{21}$ in density are extended. Also, the second impurities are diffused to portions contiguous with the first and second semiconductor electrode regions 32 and 34 doped with the high-density impurities to form regions doped with low-density impurities, that is, resistive regions 36.

Figure 6C:
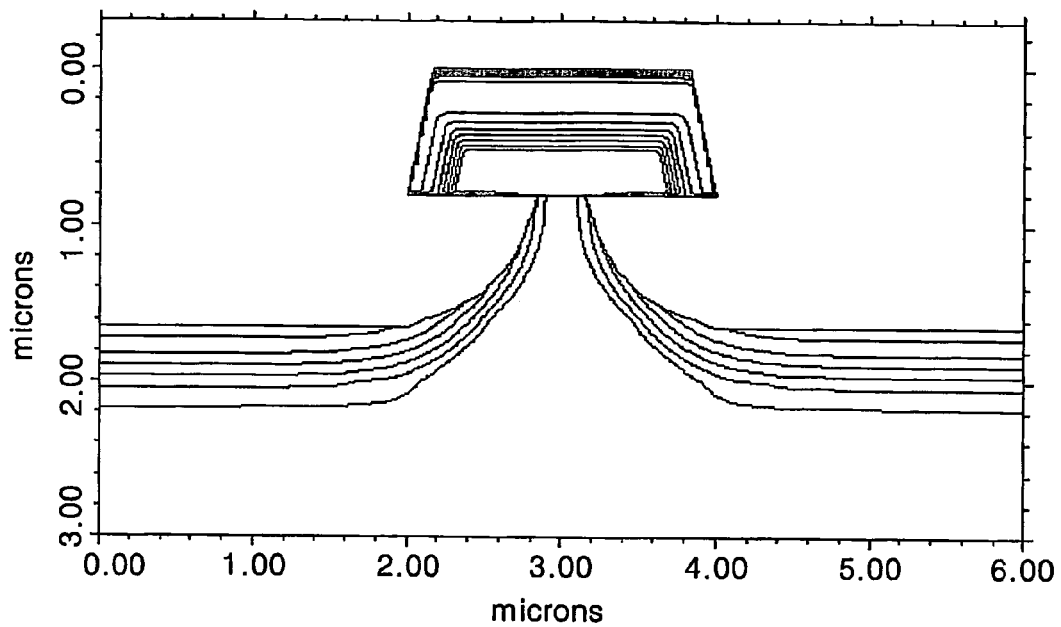

Next, the substrate 31 is etched using the patterned rectangular mask layer 33b as a mask to form a tip shaped as shown in FIG. 6C.

Figure 6D:
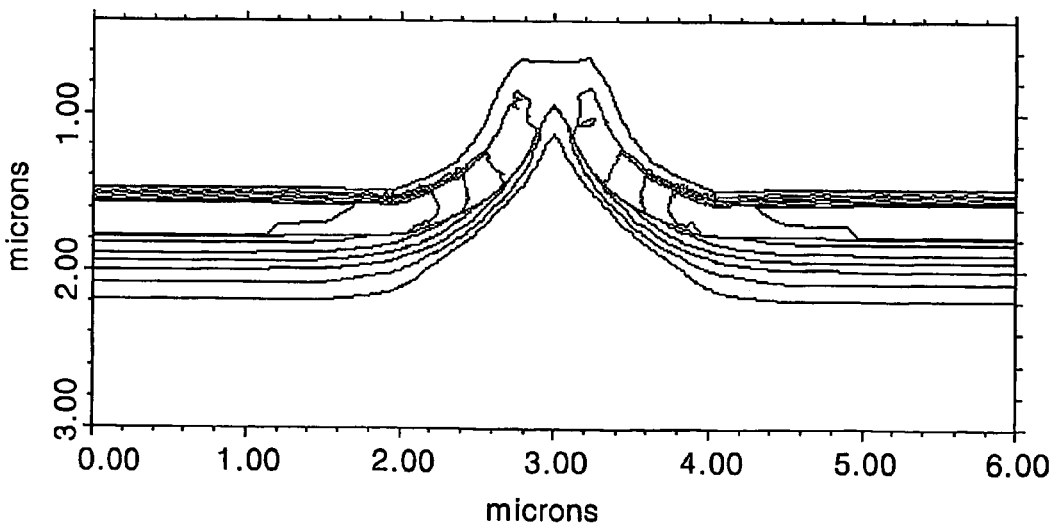

After the rectangular mask layer 33b is removed and then the substrate 31 is heated under an oxygen atmosphere, a silicone oxide layer is formed on the surface of the tip, to sharpen the tip as depicted in FIG. 6D. The resistive regions 36 which are separated from each other come in contact with each other, thereby forming the end portion of the resistive regions.

Figure 6E:
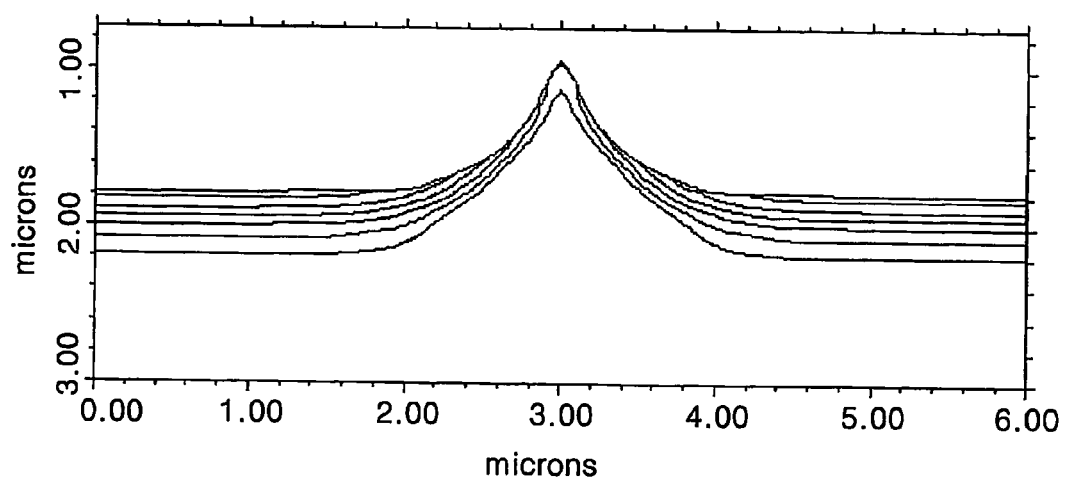

Then, the oxide layer is removed, thereby forming a sharpened tip 30 as illustrated in FIG. 6E.

A method of recording and reproducing information using the probe fabricated through the probe fabrication method according to the preferred embodiment of the present invention will be explained with reference to drawings.

Figure 7:
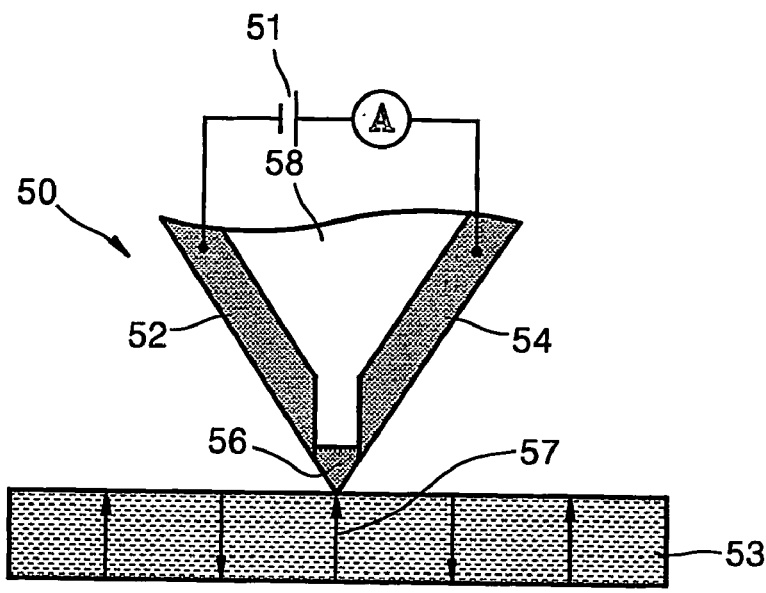
FIG. 7 is a schematic diagram for explaining a method of reproducing information using the probe fabricated according to the preferred embodiment of the present invention.

FIG. 7 is a schematic diagram for explaining an information reproduction method of detecting a positive surface charge using a probe with a resistive region doped with p-type impurities.

Referring to FIG. 7, in the event that the first and second semiconductor electrode regions 52 and 54 are doped with high-density p-type impurities and the resistive region 56 is doped with the low density p-type impurities, when the tip is located above a positive surface charge 57, a depletion region is formed in the resistive region 56 at the end of the tip due to an electric field generated by the charge 57.

Since the depletion region functions as a non-conducting region, the area of the resistive region 56 is accordingly reduced, thereby increasing a resistance value. When a power source 51 and an ammeter A are connected to the first and second semiconductor electrode regions 52 and 54, changes in current due to changes in the resistance value of the resistive region 56 can be detected. As a result, the positive surface charge 57 can be detected by the resistive tip 50. When the tip is located above a negative surface charge, no depletion region is formed such that there is little or a smaller change in a resistance value. As a result, the polarity of the surface charge can be recognized. A negative charge may be defined as a binary 0 and a positive charge may be defined as a binary 1, and vice versa.

An information reproduction method of detecting a negative surface charge using a tip 50 with a resistive region 56 doped with low-density n-type impurities is similar to that explained in FIG. 7, and thus a detailed explanation thereof will be omitted.

Figure 8:
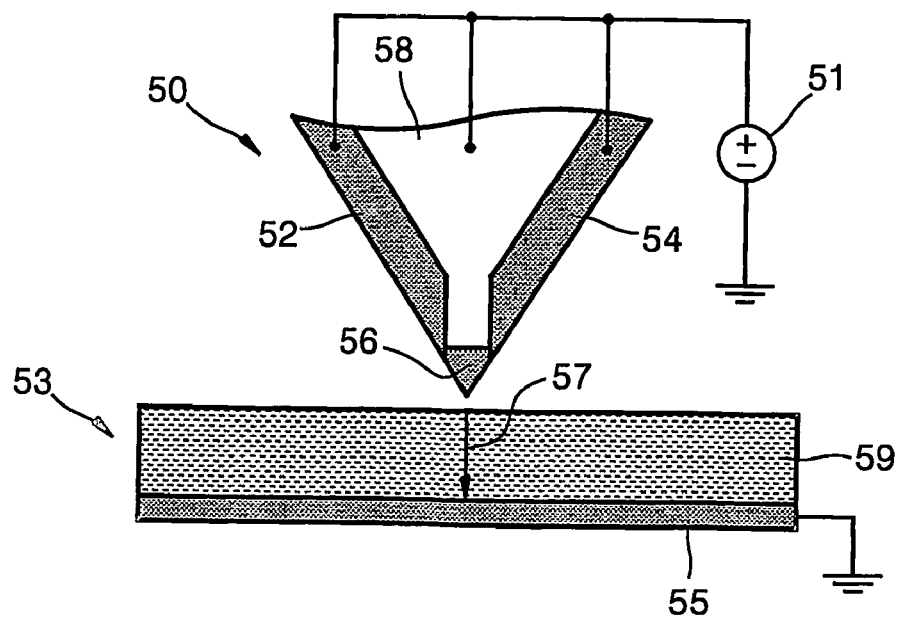
FIG. 8 is a schematic diagram for explaining a method of recording information using the probe fabricated according to the preferred embodiment of the present invention.

FIG. 8 is a schematic diagram illustrating a method of recording information on a recording medium 53 using a semiconductor probe with a resistive tip.

Referring to FIG. 8, to record information on the recording medium 53, the same voltage is applied to both the first and second semiconductor electrode regions 52 and 54 and the body part 58 of the tip 50, and a bottom electrode 55 supporting a dielectric layer 59 is grounded to form an electric field between the peak of the tip 50 and the bottom electrode 55 of the recording medium 53. Herein, even though the same voltage is applied to the first and second semiconductor electrode regions 52 and 54, an electric field can be formed between the tip 50 and the bottom electrode 55 to record information on the recording medium 53.

After the electric field is formed, dielectric polarization 57 of a ferroelectric in the recording medium 53 is generated such that surface charge may be formed or the polarity of an existing surface charge may be changed. A positive charge may be defined as a binary 0 and a negative charge may be defined as a binary 1, and vice versa.

While the present invention has been particularly shown and described with reference to preferred embodiments thereof, it will be understood by those of ordinary skill in the art that various changes in form and details may be made therein without departing from the spirit and scope of the present invention as defined by the following claims.

INDUSTRIAL APPLICABILITY

As described above, according to the method of fabricating the semiconductor probe with the resistive tip of the present invention, the resistive regions existing between the semiconductor electrode regions can be formed at the center of the peak of the tip by self-alignment, and the resistive regions lightly doped with second impurities can be formed through a thermal diffusion process, thereby simplifying the semiconductor probe fabrication process. According to this fabrication method, resistive regions of a smaller width can be realized at the tip which is vertically mounted on the end of the cantilever. Therefore, it is easy to fabricate a nano-scale device using a scanning probe microscopy technique for detecting a small amount of positive surface charge existing in a small region on a recording medium.

Further, when the probe as fabricated above is applied to a compact, high-capacity information storage device using a scanning probe microscopy technique, a charge existing in a small region can be detected to record and reproduce information.

What is claimed is:

1. A method of fabricating a semiconductor probe which includes a cantilever and a tip doped with first impurities formed on an end portion of the cantilever, wherein a resistive region lightly doped with second impurities is formed at a peak of the tip, and first and second semiconductor electrode regions heavily doped with the second impurities are formed at inclined surfaces of the tip, the polarity of the second impurities being opposite to that of the first impurities, the method comprising:

(a) forming a stripe-shape mask layer on a substrate doped with first impurities and forming first and second semiconductor electrode regions by heavily doping second impurities on the substrate uncovered by the mask layer, the second impurities being opposite in polarity to the first impurities;

(b) annealing the substrate to narrow a distance between the first and second semiconductor electrode regions and form resistive regions lightly doped with the second impurities at outer boundaries of the first and second semiconductor electrode regions;

(c) patterning the mask layer in a predetermined shape and etching a portion of a top surface of the substrate not covered by the patterned mask layer to form a resistive tip; and (d) etching a bottom surface of the substrate to form a cantilever with the resistive tip formed at an end portion thereof.

2. The method of claim 1, wherein step (b) forms a tip forming portion by allowing the resistive regions obtained by diffusing the first and second semiconductor electrode regions to come in contact with each other.

3. The method of claim 1, wherein step (c) further includes forming a stripe-shape photoresist in an orthogonal direction to the mask layer, and performing an etching process to make the mask layer in a rectangular shape.

4. The method of claim 1, wherein step (c) further includes:

removing the patterned mask layer from the substrate and annealing the substrate under an oxygen atmosphere to form an oxide layer of a predetermined thickness on the surface of the substrate; and removing the oxide layer to sharpen an end of the resistive regions.

5. The method of claim 4, wherein step (c) forms a tip forming portion by diffusing the first and second semiconductor electrode regions come in contact with each other on an upper part of the substrate.

6. The method of claim 1, wherein the first impurities are p-type impurities, and the second impurities are n-type impurities.

7. The method of claim 1, wherein the first impurities are n-type impurities, and the second impurities are p-type impurities.

* * * * *